United States Patent
Hikichi et al.

(10) Patent No.: US 11,260,734 B2
(45) Date of Patent: Mar. 1, 2022

(54) TRIM FOR VEHICLE

(71) Applicant: TOKAI KOGYO CO., LTD., Obu (JP)

(72) Inventors: Shinji Hikichi, Obu (JP); Hiroyuki Nishiwaki, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 43 days.

(21) Appl. No.: 16/740,566

(22) Filed: Jan. 13, 2020

(65) Prior Publication Data
US 2020/0238804 A1    Jul. 30, 2020

(30) Foreign Application Priority Data
Jan. 25, 2019  (JP) .............................. JP2019-010774

(51) Int. Cl.
*E06B 7/16* (2006.01)
*B60J 10/248* (2016.01)
*B60J 10/80* (2016.01)
*B60J 10/32* (2016.01)
*B60J 10/16* (2016.01)

(52) U.S. Cl.
CPC ............ *B60J 10/248* (2016.02); *B60J 10/80* (2016.02); *B60J 10/16* (2016.02); *B60J 10/32* (2016.02)

(58) Field of Classification Search
CPC . B60J 10/248; B60J 10/80; B60J 10/32; B60J 10/16; B60J 10/84; B60J 10/33; B60J 10/18; B60J 10/00
USPC .................................. 49/490.1, 495.1, 479.1
See application file for complete search history.

(56) References Cited

U.S. PATENT DOCUMENTS

| | | | |
|---|---|---|---|
| 4,123,100 A * | 10/1978 | Ellis ........................ | B60J 10/18 296/93 |
| 5,411,785 A * | 5/1995 | Cook ...................... | B60J 10/265 428/122 |
| 5,511,343 A | 4/1996 | Guillon | |
| 7,543,881 B2 * | 6/2009 | Okajima .................. | B60J 10/32 296/146.9 |

(Continued)

FOREIGN PATENT DOCUMENTS

| | | | |
|---|---|---|---|
| JP | H07-504378 A | 5/1995 | |
| JP | 2002316537 A * | 10/2002 | ............. B60J 10/24 |

(Continued)

OTHER PUBLICATIONS

Dec. 14, 2021 Office Action issued in Japanese Patent Application No. 2019-010774.

*Primary Examiner* — Jerry E Redman
(74) *Attorney, Agent, or Firm* — Oliff PLC

(57) ABSTRACT

A trim for a vehicle comprising: an attachment portion including an exterior lateral wall portion, an interior lateral wall portion, and a top wall portion that connects the exterior and interior lateral wall portions; a core embedded in the attachment portion; and a holding lip protruding from an interior surface of at least one of the exterior and interior lateral wall portions, wherein the attachment portion and the holding lip are formed of a foamed polymer material, and wherein among tip end portions of the exterior lateral wall portion and the interior lateral wall portion, the tip end portion of at least one of the exterior and interior lateral wall portions is covered with a covering portion formed of a non-foamed polymer material.

10 Claims, 7 Drawing Sheets

(56) References Cited

U.S. PATENT DOCUMENTS

| | | | |
|---|---|---|---|
| 9,994,095 B2* | 6/2018 | Sato | B60J 10/15 |
| 2002/0152687 A1* | 10/2002 | Willett | B60J 10/33 |
| | | | 49/475.1 |
| 2006/0186695 A1* | 8/2006 | Hiroe | B29C 48/17 |
| | | | 296/146.9 |
| 2009/0120007 A1* | 5/2009 | Aritake | B60J 10/17 |
| | | | 49/490.1 |
| 2010/0077672 A1* | 4/2010 | Nozaki | B60J 10/16 |
| | | | 49/483.1 |
| 2010/0192470 A1* | 8/2010 | Hamada | B60J 10/80 |
| | | | 49/493.1 |
| 2011/0023372 A1* | 2/2011 | Miyakawa | B29C 48/90 |
| | | | 49/490.1 |
| 2013/0067821 A1* | 3/2013 | Otsuka | B60J 10/248 |
| | | | 49/490.1 |
| 2015/0082710 A1* | 3/2015 | Hamada | B60J 10/24 |
| | | | 49/490.1 |
| 2017/0225554 A1* | 8/2017 | Matsuwaki | B60J 10/80 |
| 2019/0016203 A1* | 1/2019 | Matsuura | B60J 10/84 |
| 2020/0238804 A1* | 7/2020 | Hikichi | B60J 10/80 |

FOREIGN PATENT DOCUMENTS

| | | |
|---|---|---|
| JP | 2010-215149 A | 9/2010 |
| JP | 2011-178199 A | 9/2011 |
| JP | 2013-129392 A | 7/2013 |
| JP | 2015-120366 A | 7/2015 |

* cited by examiner

A-A CROSS SECTIONAL VIEW

EXTERIOR SIDE ← → INTERIOR SIDE

TRIM FOR VEHICLE

CROSS-REFERENCE TO RELATED APPLICATIONS

This application claims priority from Japanese Patent Application No. 2019-010774 filed on Jan. 25, 2019, the entire contents of which are incorporated herein by reference.

TECHNICAL FIELD

The present disclosure relates to a trim for a vehicle formed in an elongated shape with a polymer material.

BACKGROUND ART

Generally, a trim is attached to a flange provided along a peripheral edge of an opening portion, such as a door opening portion and a trunk opening portion, of a vehicle body of an automobile or the like. Such a trim is formed into a shape having an attachment portion which has a substantially U-shaped cross section by extrusion molding of a polymer material, and is attached to a flange by sandwiching the flange from both sides by the attachment portion. In such a trim, a reinforcing core is embedded in the attachment portion having the substantially U-shaped cross section, so that the attachment portion can be stably attached to the flange.

In recent years, as components to be attached to the vehicle body have been required to be reduced in weight, the trim is also required to be reduced in weight. Thus, as described in Patent Literature 1 (JP-A-2015-120366), a trim is formed of a foamed polymer material (polymer material which is foamed) to reduce the weight. The foamed polymer material has a smaller specific gravity than a non-foamed polymer material (polymer material which is not foamed) and is effective in reducing the weight.

In recent years, the components to be attached to the vehicle body have been required to be reduced in weight and also in size. In response to this request, for example, in a case where the trim is reduced in size by shortening both lateral wall portions of the trim, a size of the core, a position of a holding lip, a positional relationship between a tip end of the core and the holding lip may be set equal to a case where both of the lateral wall portions are not shortened such that the attachment portion can maintain a force (holding force) for sandwiching the flange. In this case, the thickness of a tip end portion of the lateral wall portion covering the tip end of the core, which has the substantially U-shaped cross section and is embedded in the attachment portion having the substantially U-shaped cross section so as to extend between both of the lateral wall portions of the attachment portion, becomes thinner. Here, since the foamed polymer material, which is a material for forming the lateral wall portion, has weaker tear strength compared with the non-foamed polymer material, when the thickness of the tip end portion of the lateral wall portion that covers the tip end of the core becomes thinner due to the reduction in size of the trim, the tip end portion of the lateral wall portion is more easily torn since the tear strength becomes weaker, and the occurrence frequency of a problem that the tip end of the core is exposed increases.

Generally, although the trim is molded into a linear shape by extrusion molding, since the flange at the peripheral edge of the opening portion of the vehicle body to which the trim is attached is curved in accordance with the shape of the opening portion, the trim is bent according to the shape of the flange when being attached to the flange. At this time, when the trim is bent in a direction in which a tip end side of the lateral wall portion extends, since a load is applied to a particularly thin part of the tip end portion of the lateral wall portion that covers the tip end of the core, the tip end portion of the lateral wall portion is torn relatively easily by the edge of the tip end of the core, and the core may be exposed. As a result, a member to which the trim is attached may be damaged by the exposed core, the worker may be injured, and the core may rust.

SUMMARY

An object of the present disclosure is to prevent exposure of a core in a trim for a vehicle that is reduced in weight by a foamed polymer material.

According to an aspect of the disclosure, there is provided a trim for a vehicle which is formed in an elongated shape with a polymer material and is configured to be disposed between a peripheral edge of an opening portion of a vehicle body and an opening-and-closing member configured to open and close the opening portion, the trim for a vehicle comprising: an attachment portion including an exterior lateral wall portion, an interior lateral wall portion, and a top wall portion that connects the exterior lateral wall portion and the interior lateral wall portion; a core embedded in the attachment portion so as to extend from the exterior lateral wall portion to the interior lateral wall portion; and a holding lip protruding from an interior surface of at least one of the exterior lateral wall portion and the interior lateral wall portion, wherein the attachment portion is configured to be attached to a flange provided along the peripheral edge of the opening portion of the vehicle body by accommodating the flange in a gap between the exterior lateral wall portion and the interior lateral wall portion such that the holding lip abuts on the flange, wherein the attachment portion and the holding lip are formed of a foamed polymer material, and wherein among tip end portions of the exterior lateral wall portion and the interior lateral wall portion, the tip end portion of at least one of the exterior lateral wall portion and the interior lateral wall portion is covered with a covering portion formed of a non-foamed polymer material.

In this configuration, among tip end portions of the exterior lateral wall portion and the interior lateral wall portion, since the tip end portion of the at least one of the exterior lateral wall portion and the interior lateral wall portion is covered with the covering portion formed of a non-foamed polymer material having stronger tear strength than the foamed polymer material, the tip end portion of the at least one of the exterior lateral wall portion and the interior lateral wall portion can be reinforced by the covering portion. Accordingly, even if the tip end portion of at least one of the exterior lateral wall portion and the interior lateral wall portion is thinned, the covering portion formed of the non-foamed polymer material can prevent the tip end portion of the lateral wall portion from being torn by the edge of the tip end of the core, thereby preventing the core from being exposed.

DESCRIPTION OF EMBODIMENTS

Hereinafter, a specific embodiment in which a mode for carrying out the present disclosure is applied to a weather strip will be described.

Figure 1:
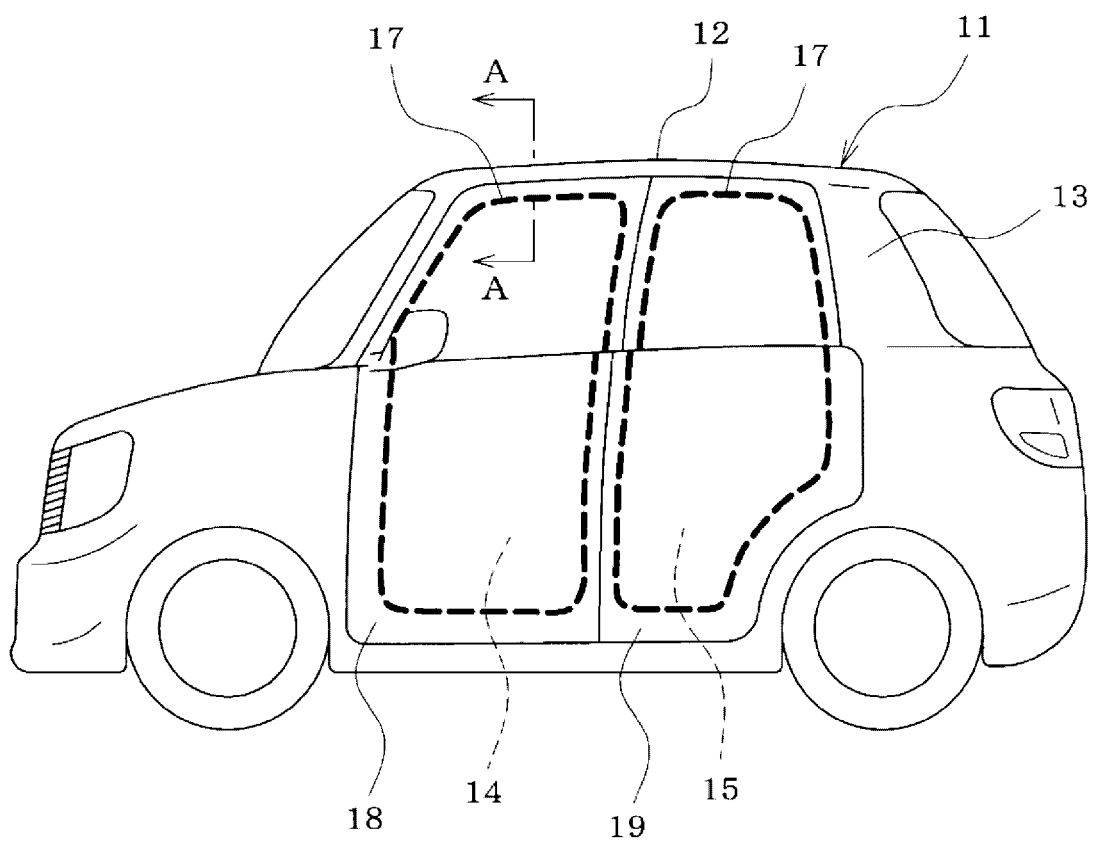
FIG. 1 is a side view showing a schematic configuration of an automobile to which a weather strip according to an embodiment of the present disclosure is attached.

As shown in FIG. 1, a vehicle body 11 of an automobile is configured by connecting a plurality of panels such as a roof panel 12 and a side panel 13. Weather strips 17 (trims) formed in an elongated shape with a polymer material are attached to flanges 16 (see FIG. 2) provided along peripheral edges of a front door opening portion 14 and a rear door opening portion 15 of the vehicle body 11, respectively. These weather strips 17 seal a space between the peripheral edge of the front door opening portion 14 and an openable and closable front door 18 (opening-and-closing member) that closes the front door opening portion 14, and seal a space between the peripheral edge of the rear door opening portion 15 and an openable and closable rear door 19 (opening-and-closing member) that closes the rear door opening portion 15.

Next, a configuration of the weather strip 17 will be described with reference to FIGS. 2 to 5.

Figure 2:
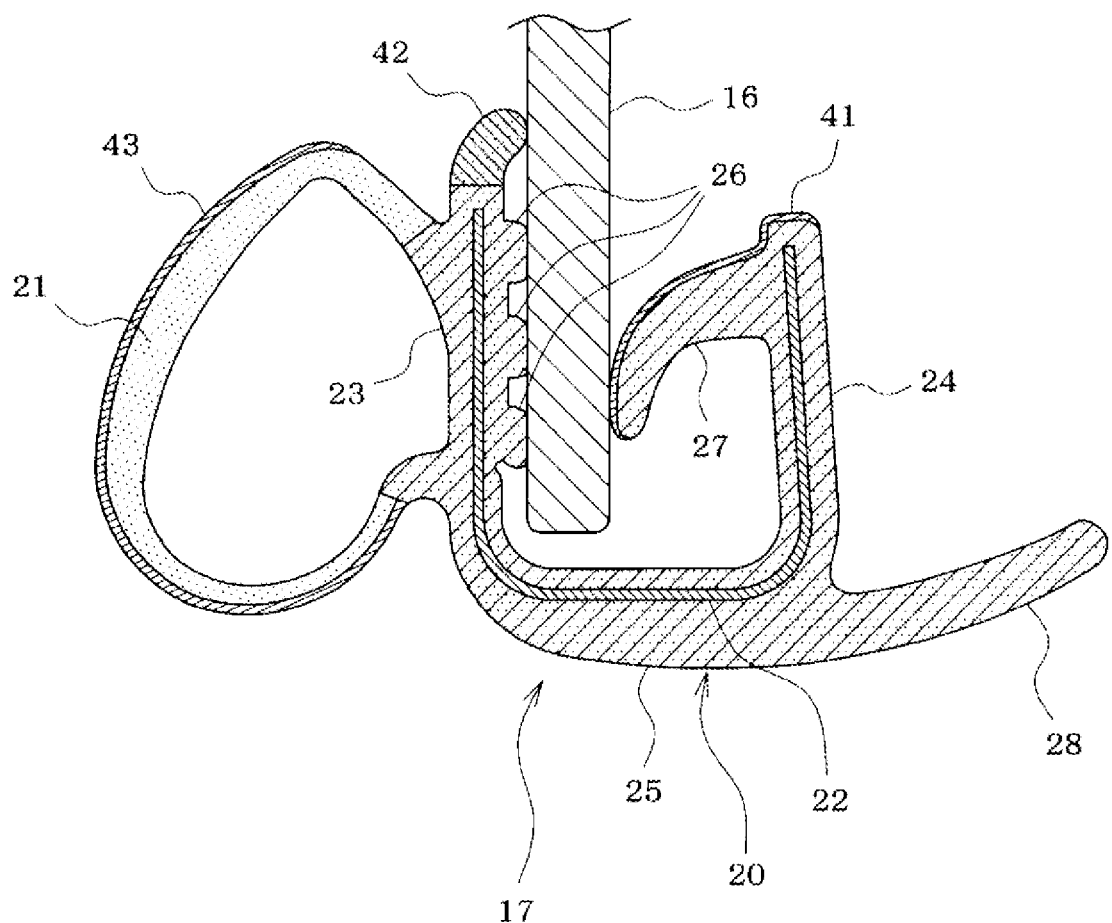
FIG. 2 is a cross-sectional view showing a state in which the weather strip is attached to a flange, taken along a line A-A of FIG. 1.
Figure 3:
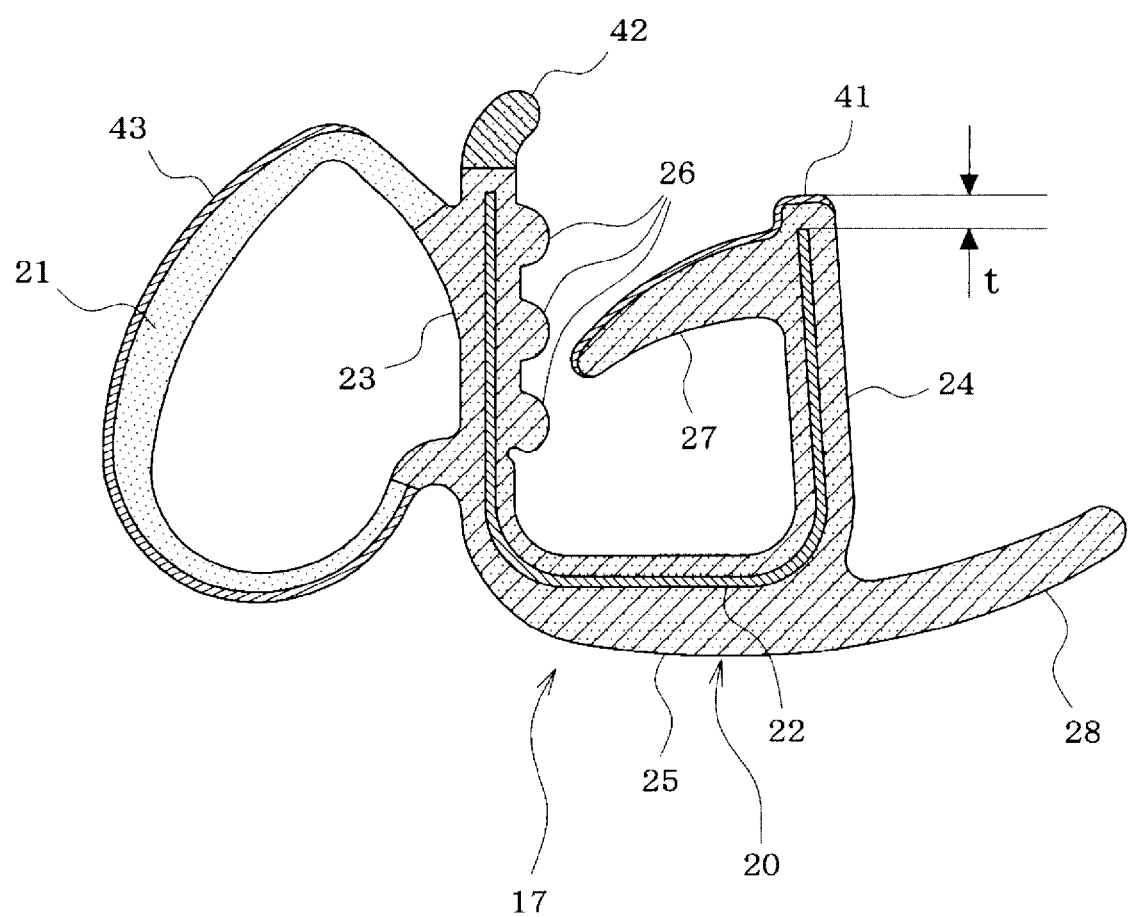
FIG. 3 is a cross-sectional view showing a state of the weather strip before being attached to the flange.
Figure 4:
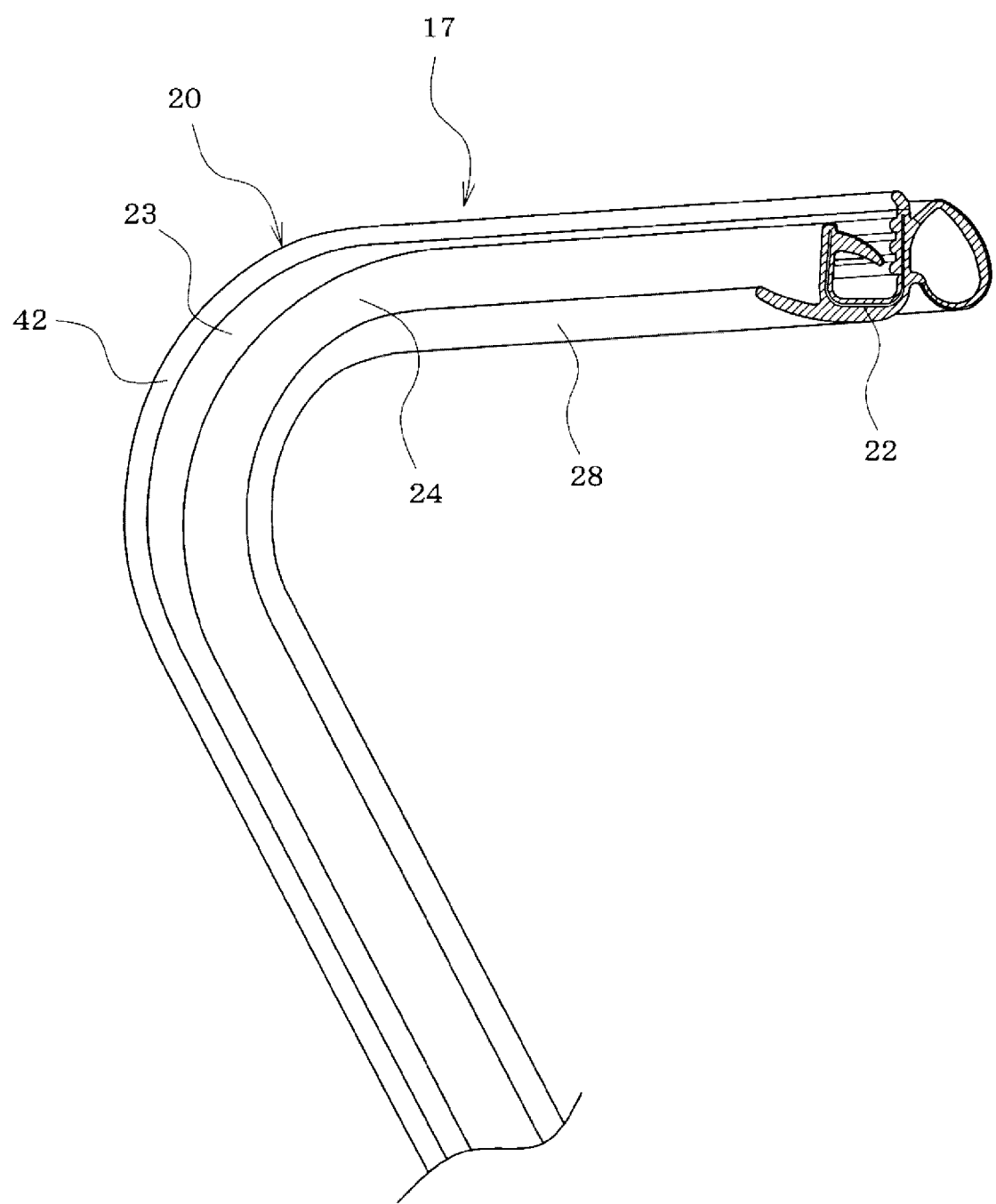
FIG. 4 is a side view of a part of the weather strip showing a state in which the weather strip is bent and attached along a corner part of a door opening portion.
Figure 5:
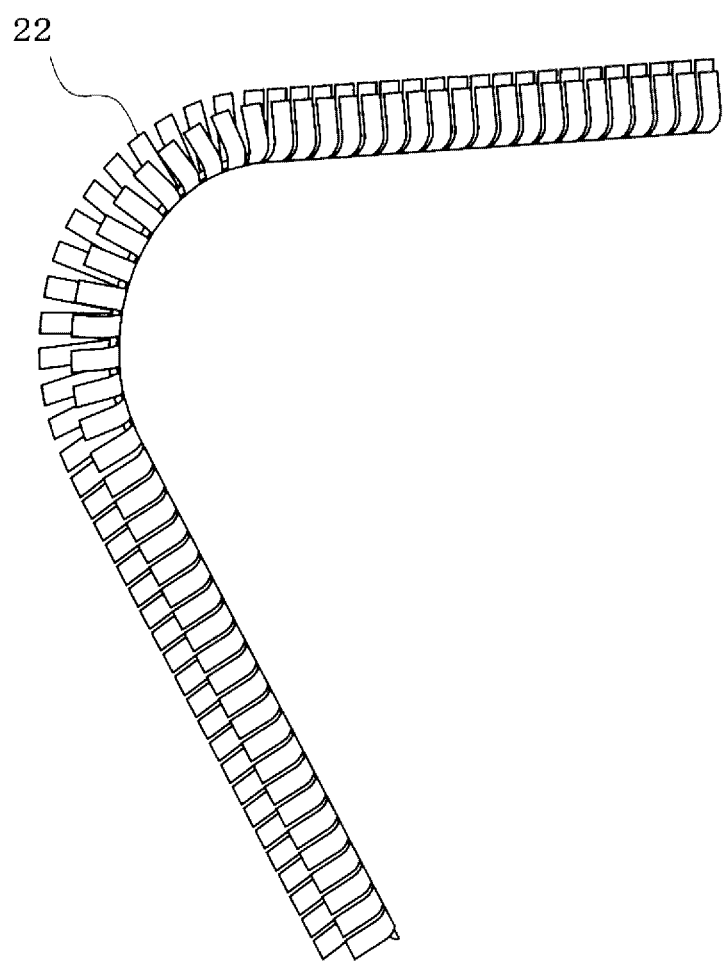
FIG. 5 is a side view showing a state of a core embedded in the weather strip in the state of FIG. 4.

As shown in FIG. 2, the weather strip 17 is integrally formed with an attachment portion 20 having a substantially U-shaped cross section and a tubular hollow seal portion 21 by extrusion molding of a polymer material having elasticity to be described below. The attachment portion 20 is integrally formed with an exterior lateral wall portion 23, an interior lateral wall portion 24, and a top wall portion 25 connecting the exterior lateral wall portion 23 and the interior lateral wall portion 24, and the hollow seal portion 21 is integrally formed on an exterior surface of the exterior lateral wall portion 23. A core 22 having a substantially U-shaped cross section formed of a metal plate, a resin plate, or the like is embedded in the attachment portion 20 to extend from the exterior lateral wall portion 23 to the interior lateral wall portion 24 by composite extrusion molding. The parts of the core 22, which are embedded in both of the exterior lateral wall portion 23 and the interior lateral wall portion 24, are formed in a comb shape as shown in FIG. 5, and the attachment portion 20 can be bent in a direction in which tip end sides of both of the exterior lateral wall portion 23 and the interior lateral wall portion 24 are stretched in a longitudinal direction.

Protruding portions 26 protruding toward the interior lateral wall portion 24 are integrally formed on an interior surface of the exterior lateral wall portion 23, and a holding lip 27 protruding toward the exterior lateral wall portion 23 is integrally formed on an interior surface of the interior lateral wall portion 24. A cover lip 28 protruding toward an interior side is integrally formed on an exterior surface of the top wall portion 25 or the interior lateral wall portion 24.

As shown in FIG. 2, by covering the flange 16 provided along the peripheral edge of each of the front side door opening portion 14 and the rear side door opening portion 15 with the attachment portion 20 of the weather strip 17, the flange 16 is inserted into a gap between the exterior lateral wall portion 23 and the interior lateral wall portion 24 of the attachment portion 20, and the attachment portion 20 is attached to the flange 16. In other words, the gap between the exterior lateral wall portion 23 and the interior lateral wall portion 24 accommodates the flange 16. At this time, the holding lip 27 abuts on the flange 16 and is elastically deformed, and the flange 16 is pressed by an elastic repulsive force of the holding lip 27 to sandwich and hold the flange 16 between the holding lip 27 and the protruding portions 26, whereby the weather strip 17 is attached and fixed to the flange 16. The weather strips 17 are disposed between the peripheral edge of the front side door opening portion 14 and the door 18, and between the peripheral edge of the rear side door opening portion 15 and the door 19, respectively. When the doors 18, 19 are closed, the doors 18, 19 abut on the hollow seal portions 21 respectively to elastically deform the hollow seal portions 21, so that the respective spaces between the flanges 16 and the doors 18, 19 are sealed by hollow seal portions 21.

The weather strip 17 of the present embodiment is formed of, for example, a polymer material such as ethylene propylene diene rubber (EPDM). However, it is necessary that the material forming the weather strip 17 is a polymer material having elasticity, and may also be a thermoplastic synthetic resin (including a thermoplastic elastomer).

The attachment portion 20, the holding lip 27, the hollow seal portion 21, the protruding portions 26, and the cover lip 28 of the weather strip 17 are formed of a polymer material which is foamed after being mixed with at least microcapsules, and more preferably a polymer material which is foamed after being mixed with microcapsules and a chemical foaming agent. In a case where both the microcapsules and the chemical foaming agent (for example, 4-4'-oxybis-benzenesulfonyl hydrazide: OBSH) are mixed, it is preferable that the microcapsules and the chemical foaming agent are mixed at a ratio of, for example, 2:1.

In the present embodiment, in a case where the weather strip 17 is formed by a foamed polymer material which is obtained by mixing the microcapsules and the chemical foaming agent at a ratio of 2:1 in the ethylene-propylene-diene rubber and foaming the mixture and has a foaming ratio in a range of 1.3 to 2.0, the specific gravity of the weather strip 17 falls within the range of 0.6 to 0.9, and the weather strip 17 can be reduced in weight.

More preferably, the hollow seal portion 21 in the weather strip 17 is formed of a foamed polymer material having a specific gravity lower than that of the attachment portion 20 or the like, for example, a foamed polymer material having a specific gravity of 0.6, so as to be easily deformable as compared with the attachment portion 20 and the like, which improves the sealing performance. The attachment portion 20, the holding lip 27, the protruding portions 26, and the cover lip 28, which are portions other than the hollow seal portion 21 in the weather strip 17, are preferably formed of a foamed polymer material having a specific gravity larger than that of the hollow seal portion 21, such as a foamed polymer material having a specific gravity of 0.75, so as to have an elastic force (holding force) larger than that of the hollow seal portion 21. The attachment portion 20, the holding lip 27, the protruding portions 26, and the cover lip 28 have a foaming ratio of 1.6. The foaming ratio is determined by 1.20/0.75, where 1.20 is the specific gravity before being formed and 0.75 is a specific gravity after being formed. In general, the foaming ratio is preferably 1.3 or more and 2.0 or less. If the foaming ratio is less than 1.3, the weather strip 17 cannot be reduced in weight. If the foaming ratio is larger than 2.0, a holding force that allows the weather strip 17 to be held to the flange 16 is reduced.

Among tip end portions of the exterior lateral wall portion 23 and the interior lateral wall portion 24 of the attachment portion 20 of the weather strip 17, the tip end portion of the interior lateral wall portion 24 is covered with a covering portion 41 formed of a non-foamed polymer material (polymer material which is not foamed) which has stronger tear strength than a foamed polymer material forming the same. A protruding piece portion 42 is integrally formed with the tip end portion of the exterior lateral wall portion 23 by a foamed polymer material (specific gravity of 0.6). An outer surface of the hollow seal portion 21 is covered with a covering portion 43 formed of a non-foamed polymer material, similarly to the covering portion 41 covering the holding lip 27. The covering portions 41, 43 and the protruding piece portion 42 are formed integrally with the attachment portion 20, the holding lip 27, the hollow seal portion 21, or the like by co-extrusion molding during the extrusion molding of the weather strip 17.

The covering portions 41, 43 are preferably formed of a non-foamed polymer material having a specific gravity in a range of 1.15 to 1.35. According to an experimental result by the present inventors, if the specific gravity of the non-foamed polymer material is less than 1.15, the reinforcing effect of the covering portions 41, 43 of the non-foamed polymer material is insufficient, and a sufficient tear prevention effect cannot be obtained. Further, if the specific gravity of the non-foamed polymer material is larger than 1.35, a sufficient weight reduction effect cannot be obtained. In the present embodiment, the specific gravity of the non-foamed polymer material forming the covering portions 41, 43 is, for example, 1.35, and since the polymer material is not foamed, the specific gravity of the non-foamed polymer material is larger than that of the foamed polymer material forming the attachment portion 20, the holding lip 27, or the like.

Compared with the foamed polymer material forming the attachment portion 20, the holding lip 27, or the like, the non-foamed polymer material forming the covering portions 41, 43 has stronger tear strength. For example, the tear strength of the foamed polymer material forming the attachment portion 20, the holding lip 27, or the like is 170 N/cm (in a case where the specific gravity is 0.75), and the tear strength of the non-foamed polymer material forming the covering portions 41, 43 is 225 N/cm (in a case where the specific gravity is 1.35).

In the present embodiment, the covering portion 41 covering the tip end portion of the interior lateral wall portion 24 formed with the holding lip 27 is formed so as to cover a region from the tip end portion of the interior lateral wall portion 24 to a part of the holding lip 27 that abuts on the flange 16. A tip end portion of the interior lateral wall portion 24 is formed such that a thickness t (see FIG. 3) covering a tip end of the core 22 is within a range of 0.5 to 2.2 mm. If the thickness is within this range, the coating portion 41 formed of the non-foamed polymer material can also ensure the tear prevention effect of the tip end portion of the interior lateral wall portion 24 while sufficiently satisfying a request for thinning the tip end portion of the lateral wall portion of the interior lateral wall portion 24.

Figure 6:
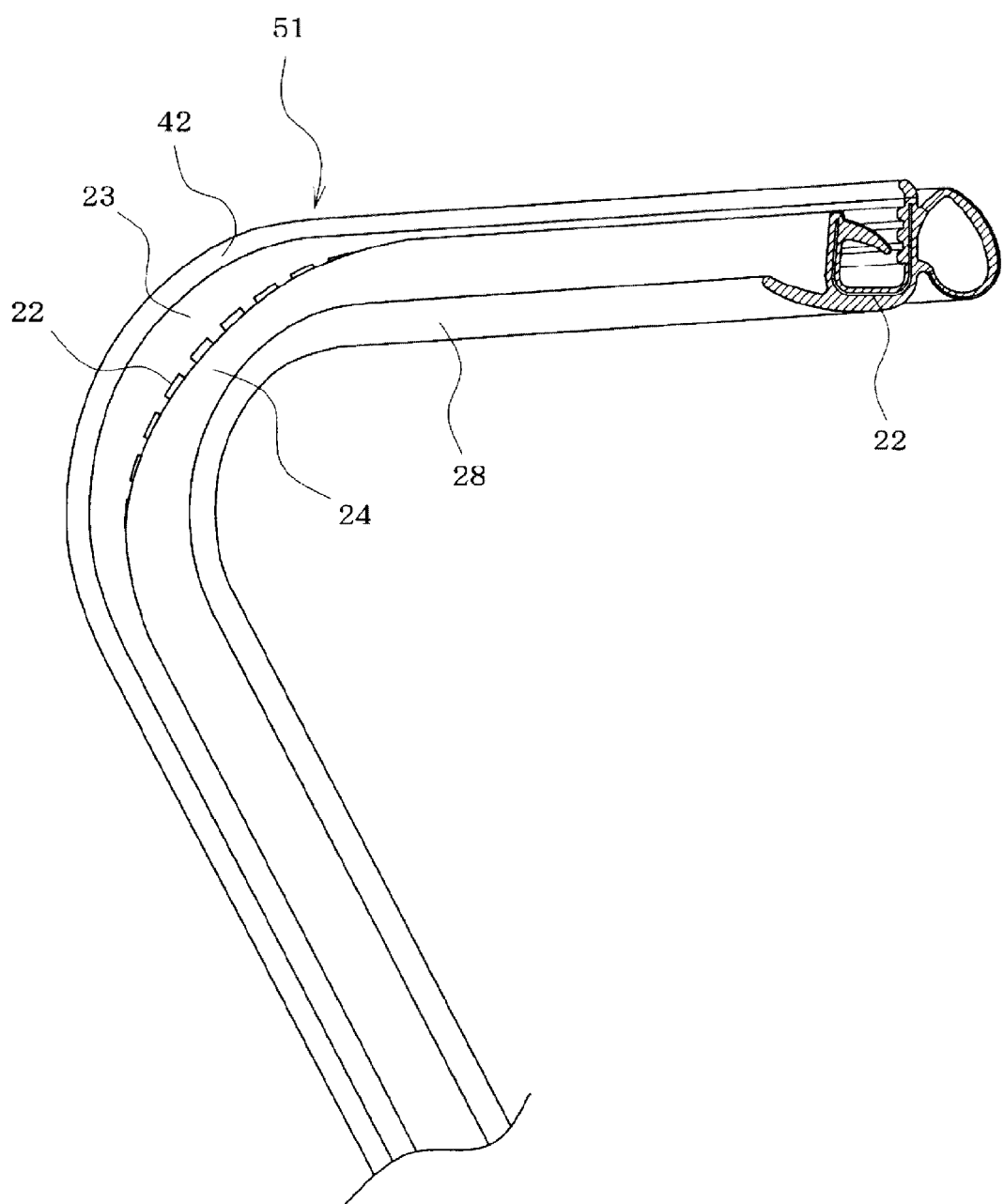
FIG. 6 is a diagram corresponding to FIG. 4, which illustrates the exposure of the core which is a problem of a related-art weather strip.

In the related art, since the tip end portions of both of the exterior lateral wall portion 23 and the interior lateral wall portion 24 are not covered with the covering portion of the non-foamed polymer material, as shown in FIG. 6, when the weather strip 51 is bent in the direction in which the tip end sides of both of the exterior lateral wall portion 23 and the interior lateral wall portion 24 are stretched during the assembly of the weather strip 51, a load is applied to a particularly thin portion of the tip end portion of the lateral wall portion 24 covering the tip end of the core 22, so that the tip portion of the lateral wall portion 24 is relatively easily torn by the edge of the tip end of the core 22, and the core 22 may be exposed.

In contrast, in the present embodiment, since the tip end portion of the interior lateral wall portion 24 of the attachment portion 20 of the weather strip 17 is covered by the covering portion 41 formed of the non-foamed polymer material having stronger tear strength than the foamed polymer material, the tip end portion of the interior lateral portion 24 of the attachment portion 20 can be reinforced by the covering portion 41. Accordingly, even if the tip end portion of the interior lateral wall portion 24 of the attachment portion 20 is thinned, the covering portion 41 formed of the non-foamed polymer material can prevent the tip end portion of the interior lateral wall portion 24 from being torn by the edge of the tip end of the core 22, thereby preventing the core 22 from being exposed.

However, the present disclosure is not limited to a configuration in which only the tip end portion of the interior lateral wall portion 24 of the attachment portion 20 is covered with the covering portion 41 formed of the non-foamed polymer material, and the tip end portions both of the lateral wall portions 23, 24 may be covered with the covering portion of the non-foamed polymer material, or only the tip end portion of the exterior lateral wall portion 23 may be covered with the covering portion of the non-foamed polymer material. Moreover, in a case where only the tip end portion of one of both of the lateral wall portions 23, 24 is covered with the covering portion of the non-foamed polymer material, it is preferable to only cover the tip end portion of the thinner lateral wall portion covering the tip end of the core 22 with the covering portion of the non-foamed polymer material.

In the present embodiment, since the covering portion 41 covering the tip end portion of the interior lateral wall portion 24 formed with the holding lip 27 is formed to cover the region from the tip end portion of the interior lateral wall portion 24 to the part of the holding lip 27 that abuts on the flange 16, the region from a root part of the holding lip 27 to the part that abuts on the flange 16 can also be reinforced by the covering portion 41 formed of the non-foamed polymer material, and a coefficient of friction of the holding lip 27 with respect to the flange 16 can be increased by the covering portion 41 formed of the non-foamed polymer material. Accordingly, the holding force caused by the abutment of the holding lip 27 on the flange 16 can be increased, and a state in which the weather strip 17 is attached to the flange 16 can be maintained more stably. In addition, since the covering portion 41 formed of the non-foamed polymer material and covering the tip end portion of the interior lateral wall portion 24 extends to the part of the holding lip 27 that abuts on the flange 16, the reinforcing effect (tear prevention effect) of the tip end portion of the interior lateral wall portion 24 by the covering portion 41 formed of the non-foamed polymer material can also be increased.

Generally, in a case where the polymer material is foamed by being mixed with the microcapsules, compared with a case where only the chemical foaming agent is mixed and foamed, a foam having a smaller specific gravity is easily obtained. Therefore, although it is effective in reducing the weight, the tear strength is weak. As in the present embodiment, if the tip end portion of the interior lateral wall portion 24 formed of the foamed polymer material obtained by at least using the microcapsules is covered with the covering portion 41 formed of the non-foamed polymer material, the effect of weight reduction, which is an advantage of the foamed polymer material obtained by the microcapsules, is ensured, and the tip end portion of the interior lateral wall portion 24 can be prevented from being torn by the edge of the tip end of the core 22 by the reinforcing effect of the covering portion 41 formed of the non-foamed polymer material. Accordingly, two contradictory requests of reducing the weight of the weather strip 17 and ensuring the tear strength of the tip portion of the interior lateral wall portion 24 can be satisfied simultaneously.

However, in the present disclosure, the attachment portion 20 or the like of the weather strip 17 may be formed of a foamed polymer material foamed by mixing the polymer material with only the chemical foaming agent. Even in this case, the intended object of the present disclosure (the exposure prevention of the core 22) can be achieved.

Further, in this embodiment, since the hollow seal portion 21 is formed of the foamed polymer material on the exterior surface of the exterior lateral wall portion 23 of the attachment portion 20, and the outer surface of the hollow seal portion 21 is covered with the covering portion 43 formed of the non-foamed polymer material, even when the hollow seal portion 21 is formed of a foamed polymer material that is easily worn, the wear of the hollow seal portion 21 can be prevented by the covering portion 43 formed of the non-foamed polymer material. The non-foamed polymer material forming the covering portion 43 covering the outer surface of the hollow seal portion 21 may be the same as or different from the non-foamed polymer material forming the covering portion 41 covering the tip end portion of the interior lateral wall portion 24.

In a case where the tip end portion of the exterior lateral wall portion 23 is covered with a covering portion formed of a non-foamed polymer material, the covering portion of the non-foamed polymer material covering the tip end portion of the exterior lateral wall portion 23 and the covering portion 43 formed of the non-foamed polymer material and covering the outer surface of the hollow seal portion 21 may be formed continuously. Alternatively, the protruding piece portion 42 at the tip end portion of the exterior lateral wall portion 23 may be formed of the non-foamed polymer material, and the protruding piece portion 42 and the covering portion 43 formed of the non-foamed polymer material and covering the outer surface of the hollow seal portion 21 may be formed continuously. In this way, it is possible to increase the reinforcing effect (tear prevention effect) of the tip end portion of the exterior lateral wall portion 23 by the covering portion formed of the non-foamed polymer material and covering the tip end portion of the exterior lateral wall portion 23 and the protruding piece portion 42. Further, if a structure in which the protruding piece portion 42 at the tip end portion of the exterior lateral wall portion 23 is formed of the non-foamed polymer material is adopted, the protruding piece portion 42 and the covering portion 43 can be continuously formed in the same molding die when the weather strip 17 is extrusion molded, so that productivity is high.

Figure 7:
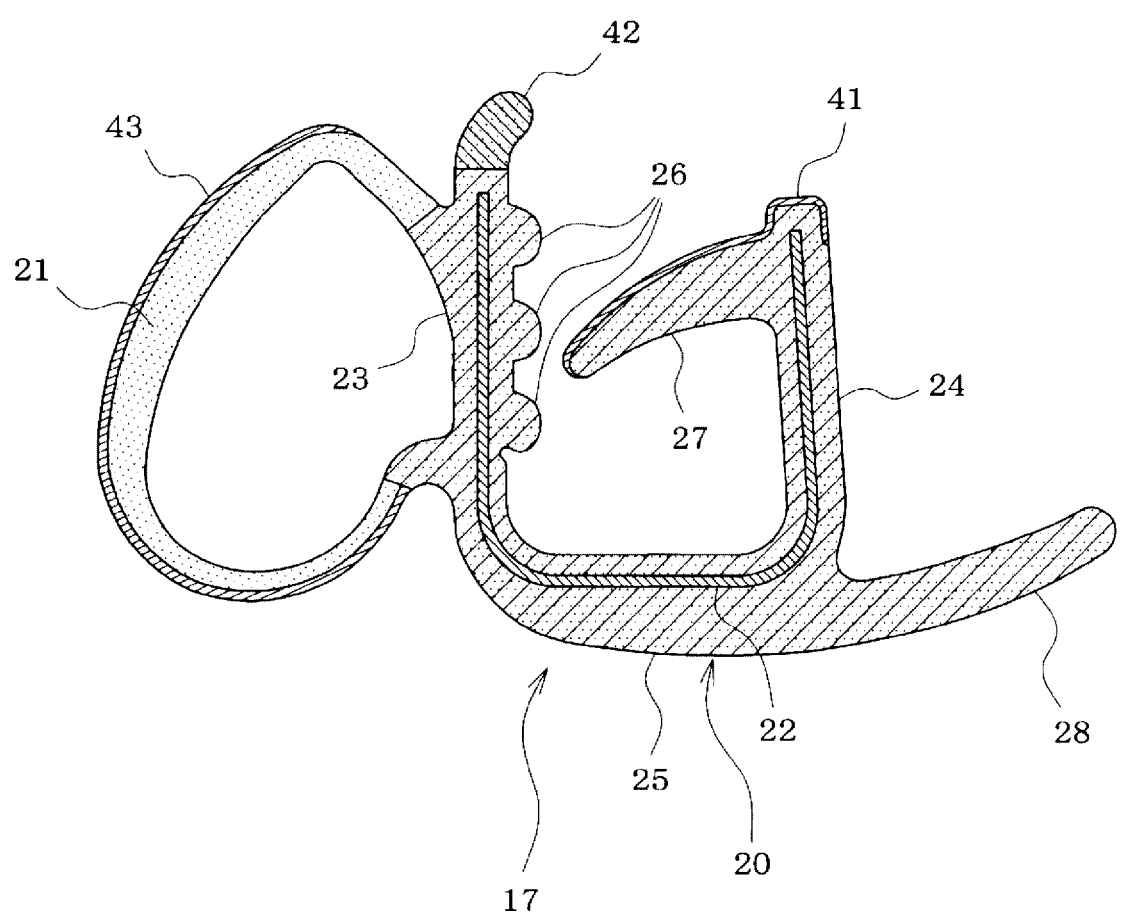
FIG. 7 is a cross-sectional view showing a state of a weather strip before being attached to a flange according to another embodiment.

In the present disclosure, as in another embodiment shown in FIG. 7, the covering portion 41 formed of the non-foamed polymer material covering the tip end portion of the interior lateral wall portion 24 may be formed to cover a region from the tip end portion of the interior lateral wall portion 24 to a position of both lateral surfaces of the interior lateral wall portion 24 beyond the tip end of the core 22. In this way, since the region from the tip end portion of the interior lateral wall portion 24 to the position of the both lateral surfaces of the interior lateral wall portion 24 beyond the tip end of the core 22 can be reinforced by the covering portion 41 formed of the non-foamed polymer material, it is possible to prevent a tear in the lateral surface near the tip end portion of the interior lateral wall portion 24 even when the position of the core 22 is shifted during the molding of the weather strip 17 and a thickness between the tip end of the core 22 and the lateral surface near the tip end portion of the interior lateral wall portion 24 becomes thinner.

In the above embodiment, although the present disclosure is applied to the weather strip in which the holding lip is provided to the interior lateral wall portion, the present disclosure is not limited thereto. For example, the present disclosure may be applied to a weather strip in which a holding lip is provided to the exterior lateral wall portion, or a weather strip in which holding lips are provided to both the interior lateral wall portion and the exterior lateral wall portion.

Further, in the above embodiment, although the present disclosure is applied to the weather strip attached to the flange which is provided along the peripheral edge of the front door opening portion or the rear door opening portion, the present disclosure is not limited thereto. The present disclosure may be applied to a weather strip attached to a flange provided along the peripheral edge of various opening portions of the vehicle body, such as a back door opening portion and a trunk opening portion.

Further, in the above embodiment, although the present disclosure is applied to the trim (weather strip) in which the tubular hollow seal portion is integrally provided with the lateral wall portion of the attachment portion, the present disclosure is not limited thereto. The present disclosure may be applied to a trim in which the tubular hollow seal portion is integrally provided with the top wall portion of the attachment portion, a trim in which a non-hollow seal portion not including a hollow portion is integrally provided with the attachment portion, or a trim not including a seal portion (hollow seal portion or non-hollow seal portion).

In addition, various modifications may be made without departing from the spirit of the present disclosure. For example, the shape of each portion (attachment portion, seal portion, holding lip, protruding portion, or the like) of the trim, the shape of the core, or the number of the holding lips may be appropriately modified.

The disclosure provides illustrative, non-limiting examples as follows:

According to a first aspect of the disclosure, there is provided a trim for a vehicle which is formed in an elongated shape with a polymer material and is configured to be disposed between a peripheral edge of an opening portion of a vehicle body and an opening-and-closing member configured to open and close the opening portion, the trim for a vehicle comprising: an attachment portion including an exterior lateral wall portion, an interior lateral wall portion, and a top wall portion that connects the exterior lateral wall portion and the interior lateral wall portion; a core embedded in the attachment portion so as to extend from the exterior lateral wall portion to the interior lateral wall portion; and a holding lip protruding from an interior surface of at least one of the exterior lateral wall portion and the interior lateral wall portion, wherein the attachment portion is configured to be attached to a flange provided along the peripheral edge of the opening portion of the vehicle body by accommodating the flange in a gap between the exterior lateral wall portion and the interior lateral wall portion such that the holding lip abuts on the flange, wherein the attachment portion and the holding lip are formed of a foamed polymer material, and wherein among tip end portions of the exterior lateral wall portion and the interior lateral wall portion, the tip end portion of at least one of the exterior lateral wall portion and the interior lateral wall portion is covered with a covering portion formed of a non-foamed polymer material.

In this configuration, among tip end portions of the exterior lateral wall portion and the interior lateral wall portion, since the tip end portion of the at least one of the exterior lateral wall portion and the interior lateral wall portion is covered with the covering portion formed of a non-foamed polymer material having stronger tear strength than the foamed polymer material, the tip end portion of the at least one of the exterior lateral wall portion and the interior lateral wall portion can be reinforced by the covering portion. Accordingly, even if the tip end portion of at least one of the exterior lateral wall portion and the interior lateral wall portion is thinned, the covering portion formed of the non-foamed polymer material can prevent the tip end portion of the lateral wall portion from being torn by the edge of the tip end of the core, thereby preventing the core from being exposed.

According to a second aspect of the disclosure, there is provided the trim for a vehicle according to the first aspect, wherein the covering portion covers a region from the tip end portion of the lateral wall portion to which the holding lip is formed to a part of the holding lip configured to abut on the flange.

In this way, the region from a root part of the holding lip to the part of the holding lip configured to abut on the flange can also be reinforced by the covering portion formed of the non-foamed polymer material, and a coefficient of friction of the holding lip with respect to the flange can be increased by the covering portion formed of the non-foamed polymer material. Accordingly, a holding force by the abutment of the holding lip on the flange can be increased, and a state in which the trim is attached to the flange can be maintained more stably. In addition, since the covering portion formed of the non-foamed polymer material and covering the tip end portion of the lateral wall portion extends to the part of the holding lip configured to abut on the flange, the reinforcing effect (tear prevention effect) of the tip end portion of the lateral wall portion by the covering portion formed of the non-foamed polymer material can also be increased.

According to a third aspect of the disclosure, there is provided the trim for a vehicle according to the first or second aspect, wherein the foamed polymer material is formed by mixing a polymer material with at least microcapsules and foaming the mixture of the polymer material and microcapsules.

Generally, in a case where the polymer material is foamed by being mixed with the microcapsules, compared with a case where only a chemical foaming agent is mixed and foamed, a foam having a smaller specific gravity is easily obtained. Therefore, although it is effective in reducing the weight, the tear strength is weak. If the tip end portion of the lateral wall portion formed of the foamed polymer material obtained by at least using the microcapsules is covered with the covering portion formed of the non-foamed polymer material, the effect of weight reduction, which is an advantage of the foamed polymer material obtained by using the microcapsules, is ensured, and the tip end portion of the lateral wall portion can be prevented from being torn by the edge of the tip end of the core by the reinforcing effect of the covering portion of the non-foamed polymer material. Accordingly, two contradictory requests of reducing the weight of the trim and ensuring the tear strength of the tip end portion of the lateral wall portion can be satisfied simultaneously.

According to a fourth aspect of the disclosure, there is provided the trim for a vehicle according to the third aspect, wherein the foamed polymer material is formed by mixing the polymer material with the microcapsules and a chemical foaming agent and foaming the mixture of the polymer material, the microcapsules and the chemical foaming agent.

In a case where the foamed polymer material is obtained by mixing the polymer material with both the microcapsules and the chemical foaming agent, as compared with the foamed polymer material obtained by mixing the polymer material with only the microcapsules, it is possible to reduce a decrease in tear strength of the foamed polymer material since the chemical foaming agent is mixed.

According to a fifth aspect of the disclosure, there is provided the trim for a vehicle according to any one of the first to fourth aspects, wherein the non-foamed polymer material of the covering portion has a specific gravity in a range of 1.15 to 1.35.

According to an experimental result by the present inventors, if the specific gravity of the non-foamed polymer material is less than 1.15, the reinforcing effect of the covering portion of the non-foamed polymer material is insufficient, and a sufficient tear prevention effect cannot be obtained. Further, if the specific gravity of the non-foamed polymer material is larger than 1.35, a sufficient weight reduction effect cannot be obtained.

According to a sixth aspect of the disclosure, there is provided the trim for a vehicle according to any one of the first to fifth aspects, wherein a foaming ratio of the foamed polymer material is 1.3 or more and 2.0 or less.

Here, the foaming ratio is a value obtained by dividing a specific gravity before foaming by a specific gravity after foaming. If the foaming ratio is less than 1.3, the trim cannot be reduced in weight. If the foaming ratio is larger than 2.0, a holding force that allows the trim to be held to the flange is reduced.

According to a seventh aspect of the disclosure, there is provided the trim for a vehicle according to any one of the first to sixth aspects, wherein the covering portion covers a region from the tip end portion of the at least one of the exterior lateral wall portion and the interior lateral wall portion to a position of both lateral surfaces of the at least one of the exterior lateral wall portion and the interior lateral wall portion beyond a tip end of the core.

In this way, since the region from the tip end portion of the at least one of the exterior lateral wall portion and the interior lateral wall portion to the position of the two lateral surfaces of the at least one of the exterior lateral wall portion and the interior lateral wall portion beyond the tip end of the core can be reinforced by the covering portion of the non-foamed polymer material, it is possible to prevent a tear in the lateral surface near the tip end portion of the lateral wall portion even when the position of the core is shifted during the molding of the trim and a thickness between the tip end of the core and the lateral surface near the tip end portion of the lateral wall portion becomes thinner.

According to an eighth aspect of the disclosure, there is provided the trim for a vehicle according to any one of the first to seventh aspects, wherein the covering portion covers a region from the tip end portion of the lateral wall portion to which the holding lip is formed to a tip end of the holding lip.

In this way, the region from a root part of the holding lip to the tip end of the holding lip configured to abut on the flange can also be reinforced by the covering portion formed of the non-foamed polymer material, and a coefficient of friction of the holding lip with respect to the flange can be increased by the covering portion formed of the non-foamed polymer material. Accordingly, a holding force by the abutment of the holding lip on the flange can be increased, and a state in which the trim is attached to the flange can be maintained more stably. In addition, since the covering portion formed of the non-foamed polymer material and covering the tip end portion of the lateral wall portion extends to the tip end of the holding lip, the reinforcing effect (tear prevention effect) of the tip end portion of the lateral wall portion by the covering portion formed of the non-foamed polymer material can also be increased.

What is claimed is:

1. A trim for a vehicle which is formed in an elongated shape with a polymer material and is configured to be disposed between a peripheral edge of an opening portion of a vehicle body and an opening-and-closing member configured to open and close the opening portion, the trim for a vehicle comprising:
   an attachment portion including an exterior lateral wall portion, an interior lateral wall portion, and a top wall portion that connects the exterior lateral wall portion and the interior lateral wall portion;
   a core embedded in the attachment portion so as to extend from the exterior lateral wall portion to the interior lateral wall portion; and
   a holding lip protruding from an interior surface of at least one of the exterior lateral wall portion and the interior lateral wall portion,
   wherein the attachment portion is configured to be attached to a flange provided along the peripheral edge of the opening portion of the vehicle body by accommodating the flange in a gap between the exterior lateral wall portion and the interior lateral wall portion such that the holding lip abuts on the flange,
   wherein the attachment portion and the holding lip are formed of a foamed polymer material, and
   wherein among tip end portions of the exterior lateral wall portion and the interior lateral wall portion, a surface of the tip end portion of at least one of the exterior lateral wall portion and the interior lateral wall portion is directly covered with a covering portion formed of a non-foamed polymer material.

2. The trim for a vehicle according to claim 1, wherein the surface that the covering portion directly covers is a region from the tip end portion of the lateral wall portion to which the holding lip is formed to a part of the holding lip configured to abut on the flange.

3. The trim for a vehicle according to claim 1, wherein the foamed polymer material is formed by mixing a polymer material with at least microcapsules and foaming the mixture of the polymer material and microcapsules.

4. The trim for a vehicle according to claim 3, wherein the foamed polymer material is formed by mixing the polymer material with the microcapsules and a chemical foaming agent and foaming the mixture of the polymer material, the microcapsules and the chemical foaming agent.

5. The trim for a vehicle according to claim 1, wherein the non-foamed polymer material of the covering portion has a specific gravity in a range of 1.15 to 1.35.

6. The trim for a vehicle according to claim 1, wherein a foaming ratio of the foamed polymer material is 1.3 or more and 2.0 or less.

7. The trim for a vehicle according to claim 1, wherein the surface that the covering portion directly covers is a region from the tip end portion of the at least one of the exterior lateral wall portion and the interior lateral wall portion to a position of both lateral surfaces of the at least one of the exterior lateral wall portion and the interior lateral wall portion beyond a tip end of the core.

8. The trim for a vehicle according to claim 1, wherein the surface that the covering portion directly covers is a region from the tip end portion of the lateral wall portion to which the holding lip is formed to a tip end of the holding lip.

9. The trim for a vehicle according to claim 1, wherein the surface of the tip end portion of the exterior lateral wall portion is directly covered with the covering portion formed of the non-foamed polymer material.

10. The trim for a vehicle according to claim 1, wherein the surface of the tip end portion of the interior lateral wall portion is directly covered with the covering portion formed of the non-foamed polymer material.

* * * * *